United States Patent [19]

Harris, Jr. et al.

[11] Patent Number: 4,712,341
[45] Date of Patent: Dec. 15, 1987

[54] MODULAR WINDOW ASSEMBLY CLIP

[75] Inventors: Charles F. Harris, Jr., Ypsilanti; James C. Coleman, Milford, both of Mich.

[73] Assignee: Ford Motor Company, Dearborn, Mich.

[21] Appl. No.: 896,492

[22] Filed: Aug. 14, 1986

[51] Int. Cl.[4] .............................................. E06B 3/00
[52] U.S. Cl. ........................................ 52/208; 52/511;
24/297; 296/84 R; 296/201
[58] Field of Search ................. 52/208, 717, 511, 765,
52/766; 296/84 R, 84 A, 201, 84 D; 24/453,
297, 328, 458, 616

[56] References Cited

U.S. PATENT DOCUMENTS

| | | | |
|---|---|---|---|
| 4,135,277 | 1/1979 | Taniai et al. | 24/297 |
| 4,161,851 | 7/1979 | Inamoto et al. | 52/208 |
| 4,235,056 | 11/1980 | Griffin | 52/397 |
| 4,591,203 | 5/1986 | Furman | 52/511 X |
| 4,611,850 | 9/1986 | Fujikawa | 52/208 X |

*Primary Examiner*—Carl D. Friedman
*Attorney, Agent, or Firm*—Daniel M. Stock; Clifford L. Sadler

[57] ABSTRACT

A clip for positioning an automotive modular window assembly within a body aperture includes a based fixed to the window and a locking leg portion depending from a positioning leg portion extending away from the window from the base, the locking leg portion being arranged angularly with respect to the positioning leg portion and terminating in a curvilinear locking surface, which may be toothed, for a cam-like locking arrangement, with the body aperture periphery.

16 Claims, 7 Drawing Figures

MODULAR WINDOW ASSEMBLY CLIP

BACKGROUND OF THE INVENTION

The present invention relates to motor vehicle window assemblies in general and more specifically to mechanisms for holding fixed motor vehicle windows in place during assembly of the vehicle.

Many non-movable windows used in modern automobiles utilize a modular window design in which a flexible material is molded in place about the periphery of the window. These so-called modular window assemblies have been found desirable by automotive designers and manufacturers since they readily permit positioning of the outer surface of the window glass close to the outer surface of the automobile body to give a flush appearance and enhance the vehicle aerodynamics. These modular window assemblies are placed, during the assembly of the vehicle, in apertures in the vehicle body formed as body panel rabbet flanges. The insertion of the modular window assemblies take place in a moving assembly line prior to the final curing of adhesive which secures the modular window assembly to that portion of the vehicle body. Since the realities of manufacturing recognize the variation in peripheral fits between the modular window assembly and the body aperture into which it is inserted, it is necessary to fix the position of the modular window assembly with respect to the body as it moves along the line toward the position in which it is finally adhesively secured. Such handling is also necessary in assembly operations in which the body is stopped for robotic assembly of windows. In the automotive industry, many clip mechanisms have been utilized to perform this function, particularly in plain fixed glass assemblies as opposed to modular window assemblies. Exemplary of such clips are those shown in U.S. Pat. Nos. 4,235,056 to Griffin, 4,161,851 to Inamoto et al. Similar clip mechanisms were fixed to the molded outer edge of modular window assemblies to perform the desired function. Such clips included mechanisms in which a leg extended perpendicularly from the glass surface and terminated in a backwardly extending free arm to angularly engage the periphery of the rabbet flange.

The use of such clips has not been found to be desirable in that they tend to not positively lock the window in position as is desired in a reliable manner.

SUMMARY OF THE INVENTION

It is accordingly the object of the present invention to provide an assembly aiding clip for use with a modular window assembly in an automotive vehicle which positively locates the modular window assembly with respect to the associated body panel of the vehicle.

It is a further object of the present invention to provide such a clip in which a relatively wide range of positions is possible in which the clip locks the modular window assembly with respect to the body panel opening.

These and other objects are accomplished in the provision of a clip in which a leg extends upwardly from a base which may be fixed or molded into the peripheral molding surface of the modular window assembly and in which a retention leg extends angularly downwardly from the termination of the upstanding leg, but it is significantly modified from the prior art clips in that a curvilinear cam like surface is formed on a portion of the leg to enhance its locking engagement with the adjustment body structure. Further improvement in the effectiveness in the range of locking positions is accomplished through the provision of plurality of teeth on the retention leg. Still further improvements in these areas are accomplished through the provision of a plurality of such retention legs in which the curvilinear locking surface of at least one of the legs is offset with respect to the others to define a series of planes acting in concert for optimum body panel opening engagement. Still further improvements are realized by a phased offsetting of locking teeth on the locking surface of the retention legs.

A further improvement in the reliability of the invention assembly clip is made possible through the provision of a mechanical interference lock between one of the legs of a multiple locking leg configuration with the base of the clip to prevent excessive deflecting excursions of the locking legs in extremely wide body openings during the assembly process.

BRIEF DESCRIPTION OF THE DRAWINGS

These and other objects and features will become apparent to those skilled in the automotive body arts upon reading the following description with reference to the attached drawings in which.

DESCRIPTION OF THE PREFERRED EMBODIMENT

Figure 1:
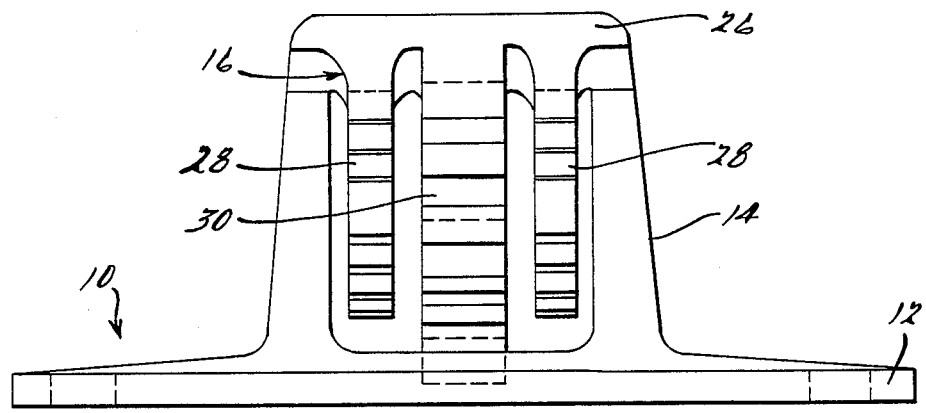
FIG. 1 is a front view of a clip according to the present invention.
Figure 2:
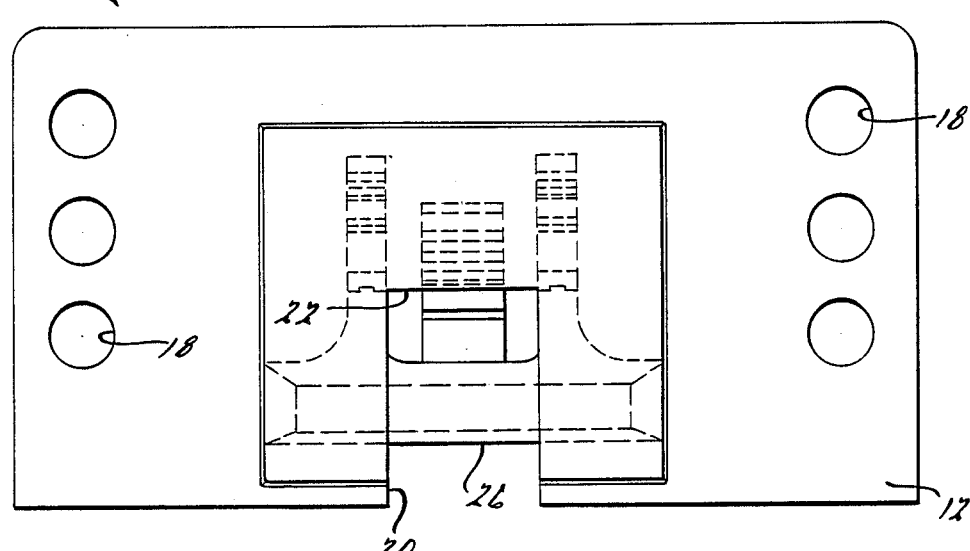
FIG. 2 is a top elevational view of the clip according to the present invention.
Figure 3:
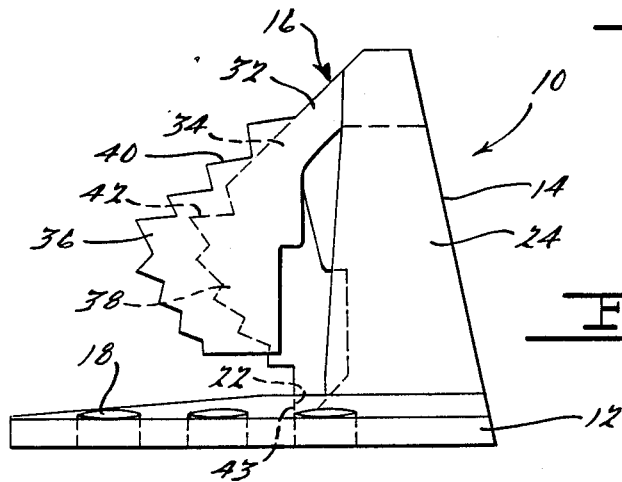
FIG. 3 is a side view.

Turning now to the drawings and in particular to FIGS. 1-3 thereof, a clip 10 is indicated as generally comprising a base portion 12, an upstanding positioning leg portion 14 and a locking leg portion 16 which depends in angled cantilever fashion from the upper end of the positioning leg 14 as viewed in FIG. 3.

The base 12 is illustrated as comprising relatively flat plate of generally rectangular cross-section and including a plurality of through holes 18 to permit the flow of a quantity of molding material for retention when the invention clip is used in applications in which it is encapsulated by molding material in the peripheral molding of a modular window assembly. The peripheral molding may be of poly vinyl chloride (PVC) or may be formed of other materials reaction injection molded about its periphery. The base 12 is also illustrated as including a generally rectangular slot 20 having an abutment surface 22 for cooperation with a surface of the locking leg portion 16.

The positioning leg portion 14 consists of a pair of generally triangular upstanding arms 24 joined at their upper arms by a bridge portion 26.

Completing the integral formation of the invention assembly clip 10, which is preferably injection molded from a nylon type 6 copolymer, the locking leg portion 16 consists of a pair of outboard locking legs 28 and a central locking leg 30 which all depend from the bridge 26. Each of the arms 28, 30 includes a canted flexing leg portion 32, 34, respectively, and a locking portion 36, 38, respectively, which extends curvilinearly downwardly from the flexing portion 32, 34 toward the base 12 and the upstanding legs 24. A plurality of ratchet teeth 40, 42 may be provided on the outer surfaces of the outer locking leg 28 and the inner locking leg 30, respectively, but provision of the curvilinear configuration of the locking portion 36, 38 effects cam-like locking action even in the absence of such teeth.

As may best be seen in FIGS. 2 and 3 in the free position of the invention clip 10, the outer surface of the inner locking leg 30 is positioned inwardly with respect to the outer surface of the outer locking legs 28 defining a smaller acute angle with the positioning leg portion 14. The inner locking leg 30 further differs from the outerlocking legs 28 in that an abutment surface 43 is provided at its lower end for engagement with the abutting surface 22 of the slot 20 in base portion 12. As may best be seen in FIG. 3, the cooperation between the abutting surface 42 and the surface 22 prevents gross outboard excursion of the canted cantilevered locking legs 28, 30.

Figure 4:
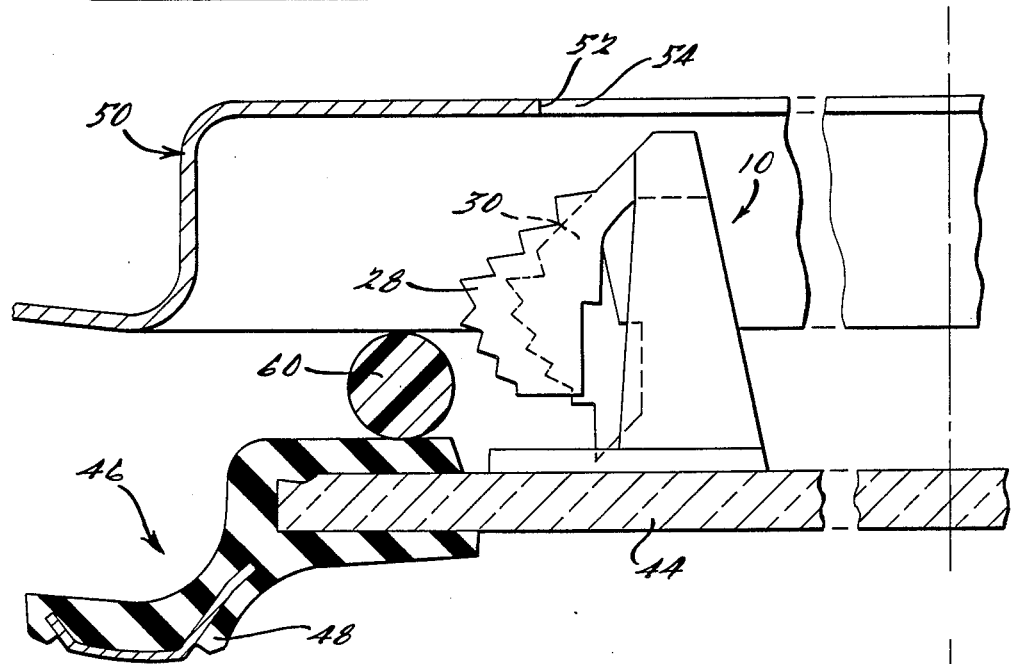
FIG. 4 is an exploded assembled side view with other parts in cross-section showing the configuration of the clip of the present invention prior to insertion into a body panel.
Figure 5:
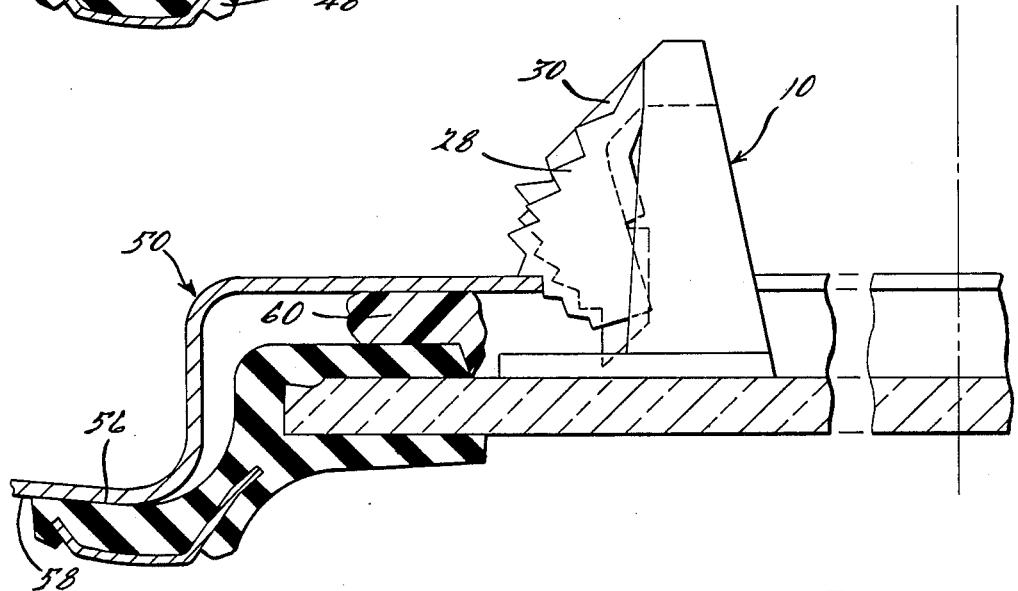
FIG. 5 is similar to FIG. 4 showing final assembled position.

Turning now to FIGS. 4 and 5, an installation of the clip 10 of the present invention is illustrated for a typical automotive window application. The clip 10 is illustrated as being fixed to the glass 44 of a modular window assembly indicated generally at 46, which includes a peripherally secured molding portion 48. It is positioned to be loaded into a depression or rabbet flange 50 of a motor vehicle body. An inner peripheral surface 52 surrounds an aperture 54 for the modular window assembly 46. Upon insertion of the modular window assembly 46 into the depression 50, as shown in FIG. 5, contact is made between outer surfaces of the locking legs (the outer legs 28 being shown as having been contacted), and deflection of the resilient legs continues as the window assembly 46 is inserted to its fully bottom position in which a portion, such as the flange area indicated at 56, contacts a surface such as 58 of the body. While only one clip 10 is shown here with its interaction with portions of the vehicle body, it is to be understood that a plurality of clips are arrayed around the periphery of the modular window assembly 46 and like deflection of the locking legs 28, 30 occurs at each clip. Because of the spacing between the outer locking legs 28 in a lateral fashion as shown in FIGS. 1 and 2 and the inward recessing of the center locking leg 30, as shown best in FIG. 2, a plurality of possible contact planes between the surface of the aperture 54 of the body and the locking legs is provided. Thus, even when the locking legs are not toothed as depicted in this preferred embodiment, a wide variety of positions with curvilinear locking surface to engage the surface 52 are provided when the resilient legs ensure engagement with the body over a wide range of positions. When the locked position of the clip 10 as shown in FIG. 5 is achieved, the modular window assembly 46 is fixed in location with respect to the flange and adhesive, such as indicated at 60, can be introduced and allowed to cure and harden as the vehicle moves along an assembly line without concern for distorting movement of the modular window assembly 46 with respect to the body. The clip 10 can fix the window position for a wide variety of assembly techniques. The adhesive 60 of course can be applied to a surface of the modular window assembly 46 prior to insertion as shown in FIG. 4 to the same advantage.

Figure 6:
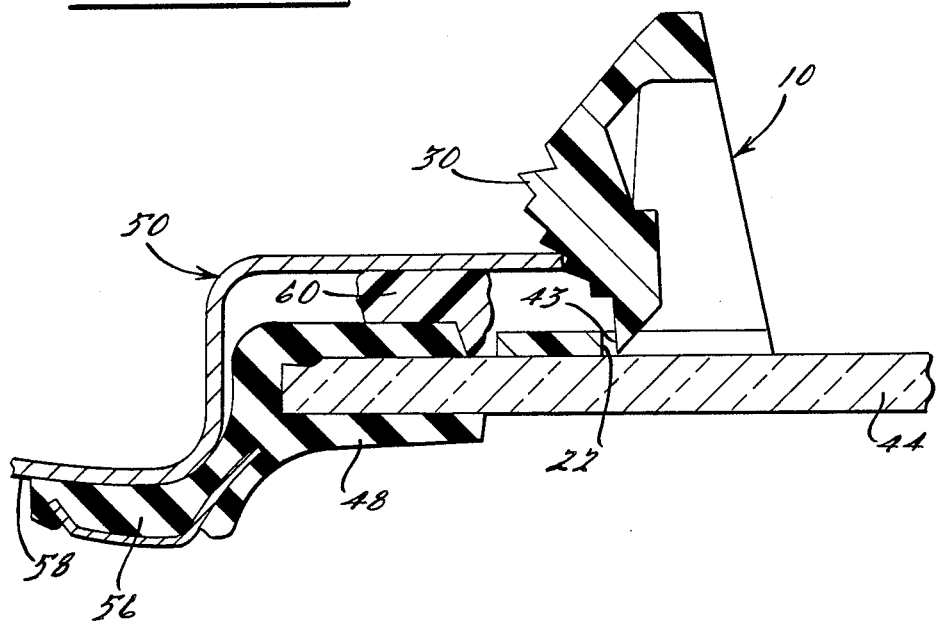
FIG. 6 is an assembled view similar to FIG. 5 showing the center locking leg in cross-section for clarity.

Turning next to FIG. 6, the clip 10 is shown in an assembled position in which a narrower aperture 54 results in engagement of the body surface 52 with the center locking leg 30 of the clip 10 resulting in its deflection inwardly beyond the position shown in FIG. 5. It will be appreciated, however, that the forces acting on the clip 10 when assembled into an aperture 54 of relatively wide dimensions will be resisted by interaction of the stop portion 43 of the center locking leg 30 with the abutment surface 22 of slot 20 in the base 12. Such forces would thus be resisted by the entire structure of the clip and would not result in gross deflection of the locking legs 28, 30.

Figure 7:
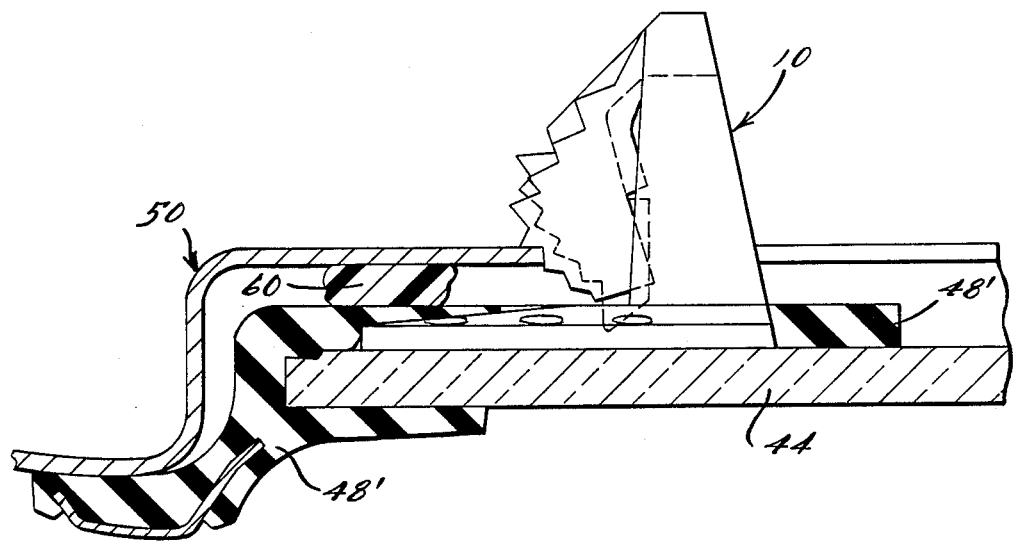
FIG. 7 shows an assembled view of an alternative assembly embodiment of the clip of the present invention in which the clip is molded within the outer molding of the modular window assembly.

Finally, turning to FIG. 7, an alternative assembly embodiment of the clip 10 of the present invention is shown in which the base 12 is encapsulated in the molding portion 48 of the modular window assembly 46 to provide even more secure retention of the clip than with respect to the modular window assembly 46.

While only two embodiments of the clip of the present and its assembly into an automobile window system are illustrated here, others are possible without departing from the scope of the intended claims and will be apparent to those skilled in the art.

We claim:

1. An automotive window assembly of the type having a modular window assembly consisting of a pane of glass surrounded by an elastomeric molding insertable into a rabbet flanged aperture in an automobile body to be adhesively secured thereto, the modular window assembly being positioned with respect to the aperture by a plurality of clip members operatively disposed between the modular window assembly and the aperture, each clip member comprising an integrally formed resilient unitary member including:

a base portion abuttingly engaging and fixedly secured to the glass pane proximate its periphery;

a positioning leg portion extending perpendicularly from the base portion away from the glass pane; and a locking leg portion comprising a locking leg extending at an acute angle in cantilever fashion from the positioning leg portion and having a curvilinearly extending locking surface formed at its free end for engagement with an inner peripheral surface of the body aperture upon insertion of the modular window assembly toward the aperture, the locking leg being inwardly deflectable toward the positioning leg portion during the insertion and being resiliently urged toward locking engagement with the peripheral surface.

2. An automotive window assembly as defined in claim 1 wherein the locking leg portion comprises a plurality of locking legs spaced from each other along the glass pane periphery.

3. An automotive window assembly as defined in claim 2 wherein at least one of the locking legs is formed at an acute angle with the positioning leg portion less than that of the remaining locking legs.

4. An automotive window assembly as defined in claim 3 wherein locking teeth are formed on the locking surface for locking engagement with the peripheral surface.

5. An automotive window assembly as defined in claim 3 wherein the clip member further comprises an abutment portion positioned on the outer side of the one locking leg adjacent the free end thereof and the base portion includes a slot positioned to receive the abutment portion and permit its inward deflection of the one locking leg, the slot terminating at one end in an abutment surface engageable with the locking leg abutment portion to limit outward deflection of the one locking leg.

6. An automotive window assembly as defined in claim 2 wherein locking teeth are formed on the locking surface for locking engagement with the peripheral surface.

7. An automotive window assembly as defined in claim 1 wherein locking teeth are formed on the locking surface for locking engagement with the peripheral surface.

8. An automotive window assembly as defined in claim 1 wherein the clip member further includes self-contained means for limiting outward deflection of the locking leg portion.

9. An automotive window assembly as defined in claim 1 wherein the base portion is mounted in encapsulated fashion within the elastomeric molding.

10. A unitary clip for positioning a modular window assembly having a pane of glass surrounded by an elastomeric molding within a recessed peripheral flange area of an automobile body window aperture, the clip comprising:
   a base having a bottom surface shaped to abuttingly engage the pane of glass;
   a pair of spaced positioning legs extending upwardly from the base;
   a bridge portion connecting the upper ends of the positioning legs, and a plurality of locking legs depending in cantilever fashion at an acute angle with respect to the positioning legs from the bridge portion, each locking leg including a curvilinearly extending locking surface formed proximate its free end and defining cam surfaces for locking engagement with portions of the automobile body window aperture.

11. A clip as defined in claim 10 wherein at least one of the locking legs depends from said bridge portion at an acute angle less than that of the remaining locking legs.

12. A clip as defined in claim 11 and further comprising an abutment portion positioned on the outer side of the one locking leg adjacent the free end thereof and the base portion includes a slot positioned to receive the abutment portion and permit its inward deflection of the one locking leg, the slot terminating at one end in an abutment surface engageable with the locking leg abutment portion to limit outward deflection of the one locking leg.

13. A clip as defined in claim 10 and further comprising self-contained means for limiting angular deflection of the locking legs in one direction.

14. A unitary clip for positioning a modular window assembly having a pane of glass surrounded by an elastomeric molding within a recessed peripheral flange area of an automobile body window aperture, the clip comprising:
   a base having a bottom surface shaped to abuttingly engage the pane of glass;
   a pair of spaced positioning legs extending upwardly from the base;
   a bridge portion connecting the upper ends of the positioning legs, and a plurality of locking legs depending in cantilever fashion at an acute angle with respect to the positioning legs from the bridge portion, each locking leg including a curvilinearly extending locking surface formed proximate its free end for locking engagement with portions of the automobile body window aperture, the locking surface including a plurality of locking teeth formed thereon and spaced along the curvilinear extent thereof.

15. A clip as defined in claim 14 wherein at least one of the locking legs depends from said bridge portion at an angle less than that of the remaining locking legs.

16. A clip as defined in claim 14 and further comprising self-contained means for limiting angular deflection of the locking legs in one direction.

* * * * *